United States Patent [19]
Bean et al.

[11] Patent Number: 5,958,028
[45] Date of Patent: Sep. 28, 1999

[54] GPIB SYSTEM AND METHOD WHICH ALLOWS MULTIPLE THREAD ACCESS TO GLOBAL VARIABLES

[75] Inventors: Clay Bean, Austin; Mike Hall, Round Rock, both of Tex.

[73] Assignee: National Instruments Corporation, Austin, Tex.

[21] Appl. No.: 08/898,051

[22] Filed: Jul. 22, 1997

[51] Int. Cl.$^6$ .................................................. G06F 13/14
[52] U.S. Cl. ............................. 710/62; 712/10; 712/241; 709/305
[58] Field of Search .................................. 395/882, 701, 395/800.1, 595; 710/62; 712/10, 241; 709/305

[56] References Cited

U.S. PATENT DOCUMENTS

| | | | |
|---|---|---|---|
| 5,421,014 | 5/1995 | Bucher | 395/650 |
| 5,481,706 | 1/1996 | Peek | 395/650 |
| 5,511,192 | 4/1996 | Shirakihara | 395/650 |
| 5,524,255 | 6/1996 | Beard et al. | 395/800 |
| 5,799,182 | 8/1998 | Gravenstien et al. | 395/595 |
| 5,812,852 | 9/1998 | Poulsen et al. | 395/706 |

*Primary Examiner*—Meng-Ai T. An
*Assistant Examiner*—Abdelmoniem I. Elamin
*Attorney, Agent, or Firm*—Conley, Rose & Tayon; Jeffrey C. Hood

[57] ABSTRACT

A system and method which enables a plurality of threads in a multithreaded application to each access per-thread copies of GPIB global variables in a GPIB system. According to the present invention, the plurality of threads use a special set of thread-local GPIB calls to perform the per-thread accesses. Whenever a thread first makes a GPIB call, the GPIB driver software begins maintaining a private copy of all of the GPIB global variables for the respective thread. The driver preferably maintains a separate private copy for each thread. Later, when the thread desires to access a per-thread copy of one or more global variables, the thread uses a thread-local GPIB call to perform the per-thread access. The thread-local functions used to access these per-thread GPIB global variables are ThreadIbsta, ThreadIberr, ThreadIbcnt, and ThreadIbcntl. When the GPIB driver level software receives a call to a thread-local function to access a per-thread global variable, the software determines the appropriate value for the respective thread and returns the per-thread value to the respective requesting thread. In one embodiment, the thread can specify a memory area where the per-thread global variables are maintained. In this manner, the thread can access the per-thread global variables directly from the specified memory area, without having to make thread-local function calls.

17 Claims, 3 Drawing Sheets

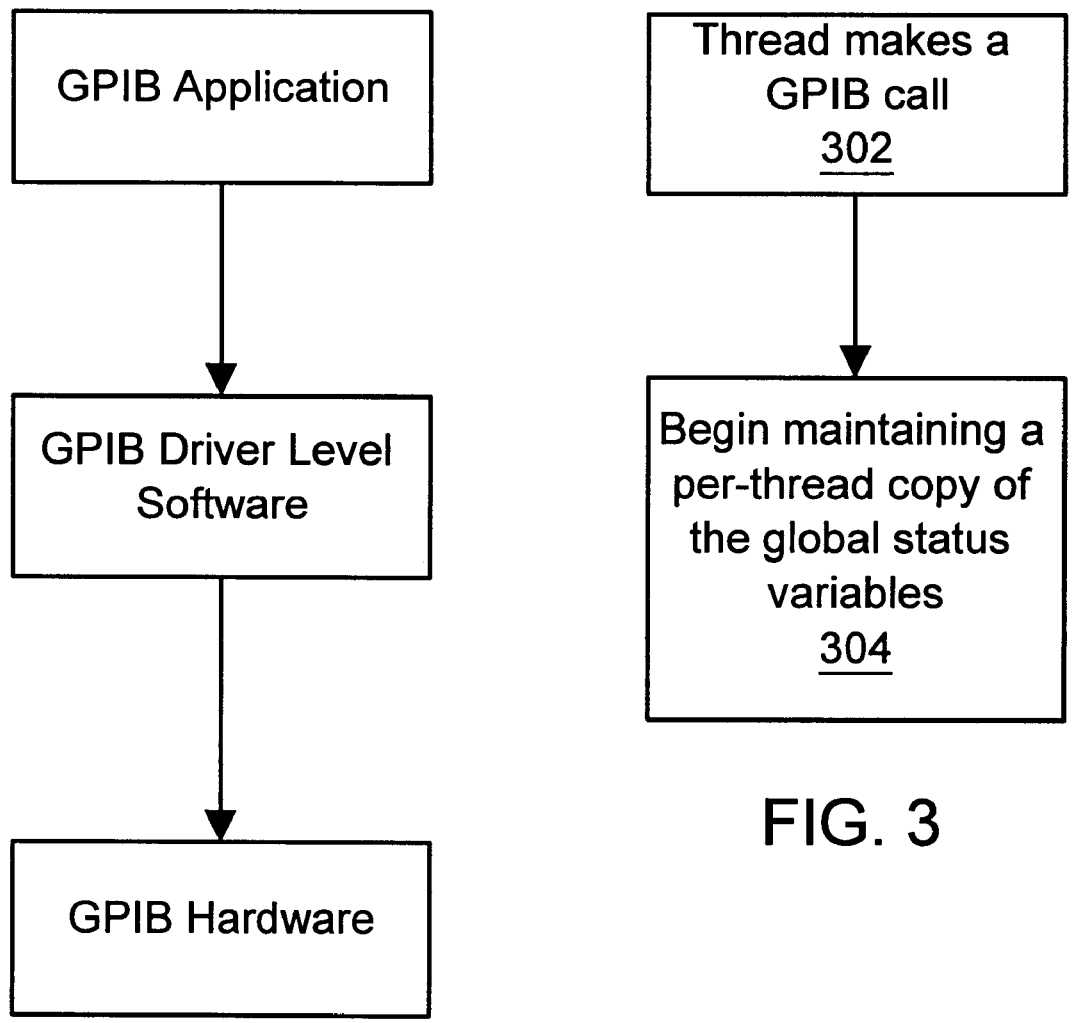

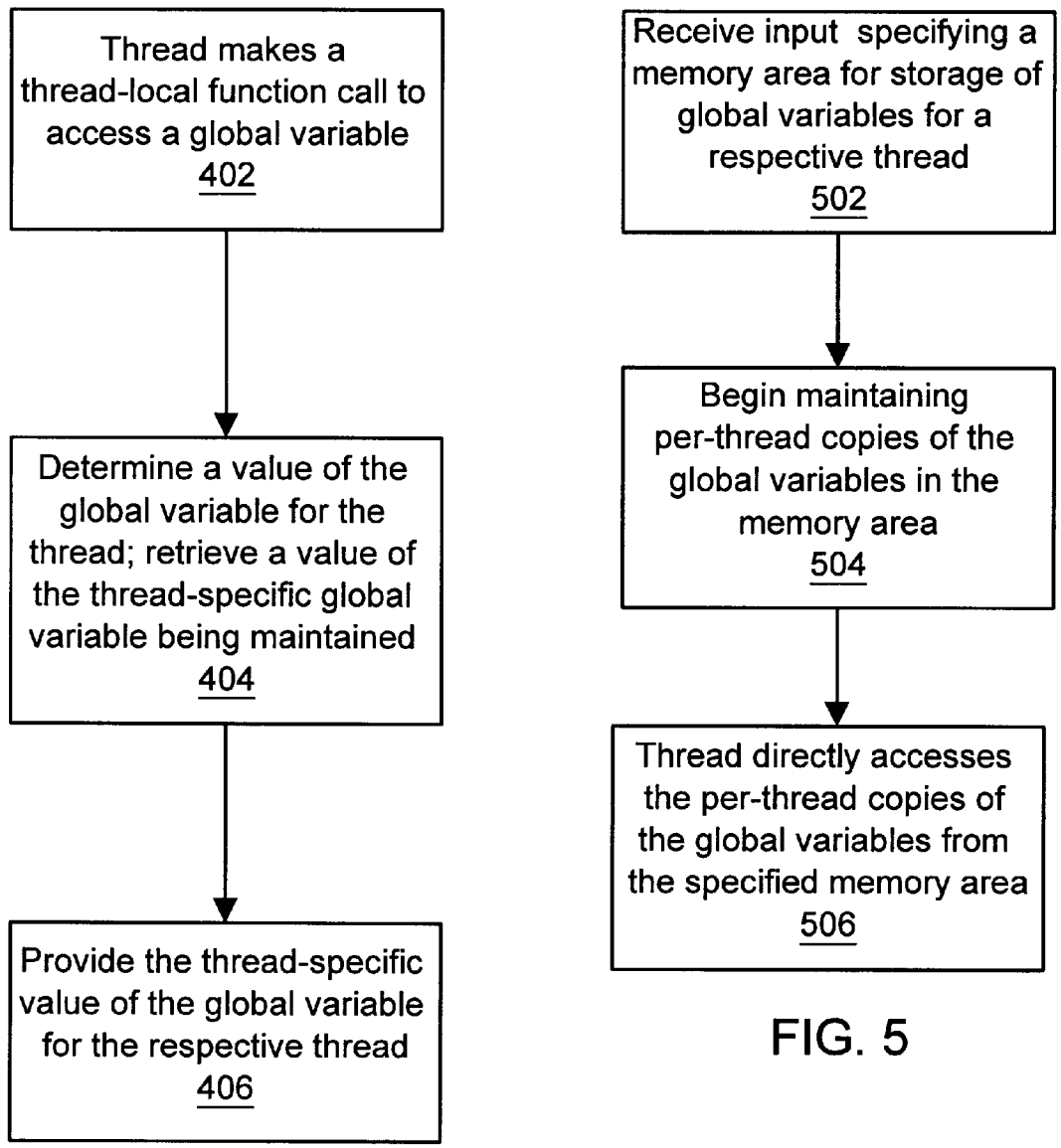

GPIB SYSTEM AND METHOD WHICH ALLOWS MULTIPLE THREAD ACCESS TO GLOBAL VARIABLES

FIELD OF THE INVENTION

The present invention relates to GPIB driver level software, and more particularly to a method for providing thread-local functions in a GPIB system to allow multiple threads to access global variables.

DESCRIPTION OF THE RELATED ART

The IEEE 488 bus, also referred to as the General Purpose Instrumentation Bus (GPIB), is used for connecting instruments and controllers to a common bus to perform various test and measurement functions. A typical GPIB system comprises one or more GPIB instruments, up to 14 instruments, and a controller, typically a GPIB interface board installed in a general purpose computer, connected by standard GPIB cables. A GPIB software application executes on the computer to control the instruments. The GPIB application interfaces through GPIB driver level software to the GPIB controller.

In response to the GPIB application, the controller provides program commands to the instruments, and the instruments return formatted data and response messages to the controller. GPIB instruments are message-based devices which are programmed with high-level ASCII character strings. A respective GPIB device includes a local processor that parses the command strings and sets the appropriate register bits to perform the indicated functions.

The original ANSI IEEE 488 standard, now referred to as IEEE 488.1, was introduced in 1975 and greatly simplified the interconnection of programmable instruments by clearly defining mechanical, electrical and hardware protocol specifications. This enabled users to connect instruments from different manufacturers to a standard cable, thus allowing the instruments to communicate with each other. The original IEEE 488.1 standard dramatically improved the productivity of test engineers. However, this original standard included a number of limitations. More specifically, the IEEE 488.1 standard did not specify data formats, status reporting guidelines, a message exchange protocol, configuration commands, or a minimum set of device commands. As a result, different manufacturers implemented each item differently, resulting in integration problems for the test system developer.

In 1987, a new IEEE 488 standard for programmable instruments and devices was approved which strengthened the original IEEE 488.1 standard by precisely defining how controllers and instruments communicated with each other. The IEEE 488.2 standard kept the IEEE 488.1 standard completely intact while also defining standard data codes and formats, a status reporting model, a message exchange protocol, a set of common commands for all instruments, and controller requirements, therefore making systems more compatible and simplifying program development. In general, the IEEE 488.2 standard focuses on software protocol issues while the IEEE 488.1 standard is primarily hardware oriented.

Thus the ANSI/IEEE Standard 488.1-1987, also known as GPIB (General Purpose Interface Bus), describes a standard interface for communication between instruments and controllers from various vendors. The IEEE 488.1 standard contains information about electrical, mechanical, and functional specifications. The GPIB is a digital, 8-bit parallel communications interface with data transfer rates of 1 Mbytes/s and above, using a 3-wire handshake. The bus supports one System Controller, usually a computer, and up to 14 additional instruments. The ANSI/IEEE Standard 488.2-1992 extends IEEE 488.1 by defining a bus communication protocol, a common set of data codes and formats, and a generic set of common device commands.

As noted above, a GPIB system includes GPIB driver level software which interfaces between a GPIB application and the GPIB hardware. The de facto standard for GPIB driver level software are the NI-488 and NI-488.2 software architectures, collectively referred to as the NI-488 software architecture, which is available in the NI-488 and NI-488.2 driver software products available from National Instruments. The NI-488 software architecture includes an Application Programming Interface (API) which allows the GPIB application to call or invoke functions in the GPIB driver level software to communicate with the GPIB hardware. In other words, the GPIB driver level software handles the details of communication, i.e., the transfer of commands and data, over the GPIB connection between the computer and the GPIB instruments.

In the NI-488 software architecture, each NI-488 function and NI-488.2 routine updates four global variables to reflect the status of the device or board being used. These global status variables are the status word (ibsta), the error variable (iberr) and the count variables (ibcnt and ibcntl). These global status variables contain useful information about the performance of the user's application. The GPIB application is generally required to check these variables after each GPIB call.

If the GPIB application is a multithreaded GPIB application, and the application makes all of its GPIB calls from a single thread, then the traditional GPIB global variables (ibsta, iberr, ibcnt, ibcntl) can be safely used. The GPIB global variables are defined on a per-process basis, so each process accesses its own copy of the GPIB globals.

If it is necessary or desirable for the multithreaded GPIB application to make GPIB calls from more than a single thread, then the traditional GPIB global variables cannot be safely used without some form of management. One way for a multithreaded GPIB application to make GPIB calls from more than a single thread using the traditional GPIB global variables is to use some form of synchronization, such as a semaphore. To understand why this is true, consider the following example. Assume that a process includes two separate threads that make GPIB calls, thread #1 and thread #2. Just as thread #1 is about to examine one of the GPIB global variables, it gets preempted and thread #2 is allowed to run. Thread #2 proceeds to make several GPIB calls that automatically update the GPIB global variables. Later, when thread #1 is allowed to run, the GPIB global variable that thread #1 is ready to examine is no longer in a known state and its value is no longer reliable. This example illustrates a well-known multithreading problem, that it is unsafe to access process-global variables from multiple threads of execution.

As noted above, this problem can be avoided by using synchronization to protect access to process-global variables. However, the synchronization solution requires that the user ensure that code that makes GPIB calls and examines the GPIB globals modified by a GPIB call is protected by a synchronization primitive. For example, each thread would be required to acquire a semaphore before making a GPIB call and then release the semaphore after examining the GPIB globals modified by the call. This complicates user development of GPIB application programs and adds overhead to execution of the program. Therefore, an improved system and method is desired for enabling a multithreaded GPIB application to make GPIB calls from more than a single thread in a GPIB system.

SUMMARY OF THE INVENTION

The present invention comprises a system and method which enables a plurality of threads in a multithreaded application to each access per-thread copies of GPIB global variables in a GPIB system. According to the present invention, the plurality of threads use a special set of thread-local GPIB calls to perform the per-thread accesses.

In the preferred embodiment, whenever a thread first makes a GPIB call, the driver begins maintaining a private copy of all of the GPIB global variables for the respective thread. The driver preferably maintains a separate private copy for each thread. Later, when the thread desires to access a per-thread copy of one or more global variables, the thread uses a thread-local GPIB call to perform the per-thread access. The thread-local functions used to access these per-thread GPIB global variables are ThreadIbsta, ThreadIberr, ThreadIbcnt, and ThreadIbcntl. When the GPIB driver level software receives a call to a thread-local function to access a per-thread global variable, the software determines the appropriate value for the respective thread and returns the per-thread value to the respective requesting thread.

In one embodiment, the thread can specify a memory area where the per-thread global variables are maintained. In this manner, the thread can access the per-thread global variables directly from the specified memory area, without having to make thread-local function calls.

BRIEF DESCRIPTION OF THE DRAWINGS

A better understanding of the present invention can be obtained when the following detailed description of the preferred embodiment is considered in conjunction with the following drawings, in which:

FIG. 2 illustrates the software architecture of the GPIB instrumentation system;

FIG. 3 is a flowchart diagram illustrating how the GPIB driver level software begins maintaining a per-thread copy of GPIB global status variables;

FIG. 4 is a flowchart diagram illustrating a thread using the thread-local access functions to access a per-thread copy of GPIB global status variables; and FIG. 5 is a flowchart diagram illustrating a GPIB application requesting the GPIB application to maintain per-thread copies of GPIB global status variables in a specified memory area for easier accessing.

DETAILED DESCRIPTION OF THE PREFERRED EMBODIMENT

Incorporation by Reference

Figure 1:
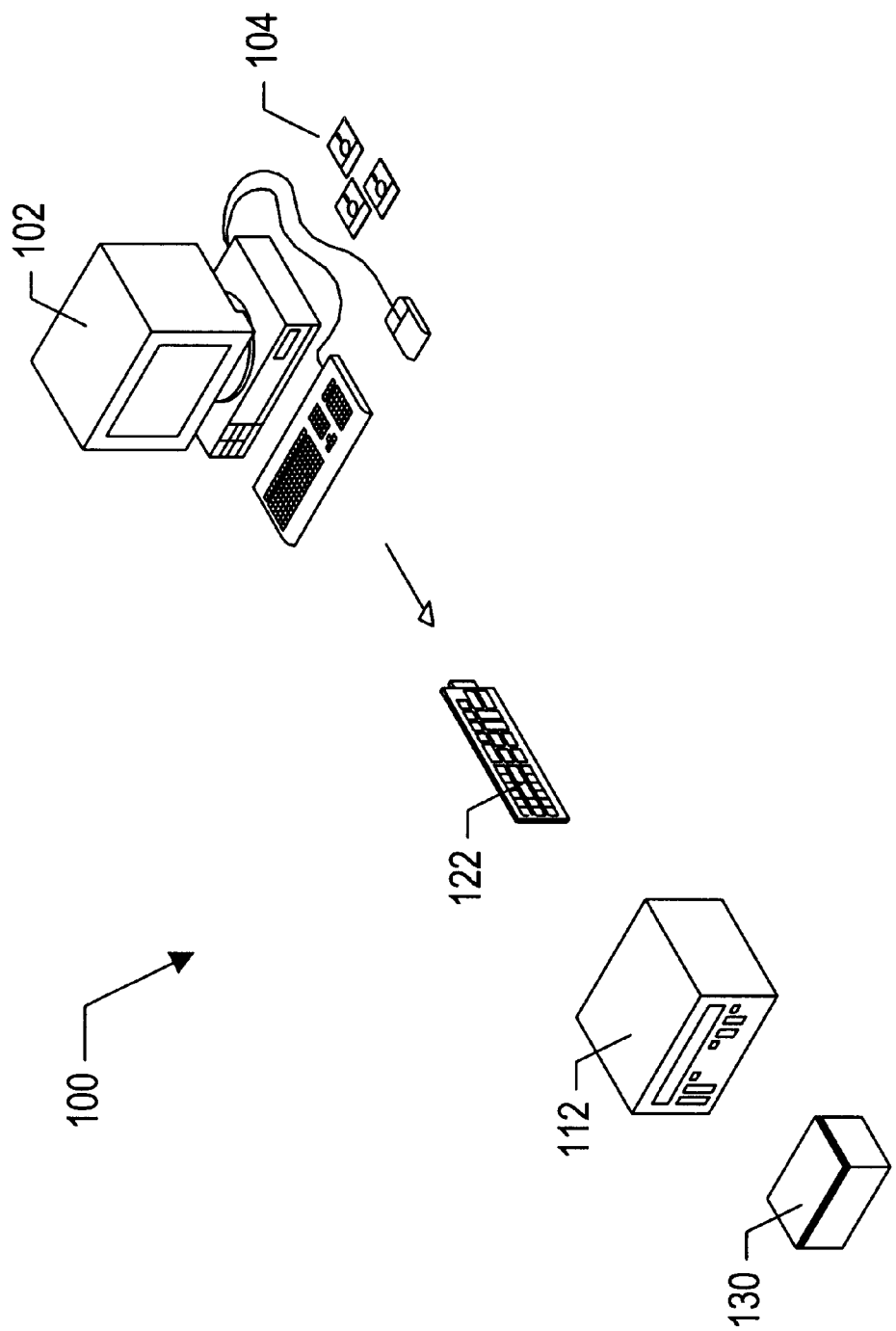
FIG. 1 illustrates a GPIB instrumentation system.

The IEEE 488.1 specification and the IEEE 488.2 specification published by the IEEE are both hereby incorporated by reference in their entirety.

The NI-488 and NI-488.2 reference manuals, available from National Instruments Corporation, are hereby incorporated by reference in their entirety.

FIG. 1—GPIB Instrumentation System

Referring now to FIG. 1, a GPIB instrumentation control system 100 is shown. The system 100 comprises a computer 102 which connects to one or more GPIB instruments. The computer 102 comprises a CPU, a display screen, memory, and one or more input devices such as a mouse or keyboard as shown. The computer 102 connects to one or more GPIB instruments 112 to analyze, measure or control a unit under test (UUT) or process 130.

The GPIB instrument 112 is coupled to the computer 102 via a GPIB interface card 122 provided by the computer 102. The GPIB card 122 is typically plugged in to an I/O slot in the computer 102, such as a PCI bus slot, a PC Card slot, or an ISA, EISA or MicroChannel bus slot provided by the computer 102. However, the GPIB interface card 122 is shown external to computer 102 for illustrative purposes. It is noted that various other types of instruments may be comprised in the instrumentation system 100, such as a data acquisition board, a VXI instrument, or a serial instrument.

The GPIB instruments are coupled to the unit under test (UUT) or process 130, or are coupled to receive field signals, typically generated by transducers. The system 100 may be used in a data acquisition and control application, in a test and measurement application, a process control application, or a man-machine interface application, among others.

The computer 102 preferably includes a memory media, such as a magnetic media, CD-ROM, or floppy disks 104. The memory media preferably stores a multi-threaded GPIB application and also stores GPIB driver level software according to the present invention. The GPIB driver level software operates to maintain per-thread copies of GPIB global variables and includes thread-local functions for accessing these per-thread copies of GPIB global variables. In the preferred embodiment, the GPIB driver level software is the NI-488.2 software available from National Instruments Corporation.

The present invention thus comprises GPIB driver level software according to the present invention stored on a memory and/or hard drive of the computer 102 and executed by a CPU of the computer 102. The CPU executing code and data from the memory thus comprises a means for allowing multiple threads to access GPIB global variables in a GPIB system according to the steps described below.

FIG. 2—GPIB Software Architecture

Referring now to FIG. 2, the software architecture for a GPIB instrumentation system is shown. As shown, the software architecture comprises a GPIB application program which interfaces through GPIB driver level software to one or more GPIB instruments.

The top level of the software architecture typically comprises a GPIB application program used for high level control of the GPIB instrument(s). The GPIB application program may operate in conjunction with one or more instrument drivers to interface through the GPIB driver level software to the GPIB instruments. The GPIB application program may be created with various development platforms, such as the LabVIEW graphical programming language or the LabWindows\CVI interactive C development environment. These software development environments include fully integrated GPIB libraries for instrument control. The GPIB application makes calls to various functions in the GPIB driver level software to communicate with the GPIB hardware.

The GPIB driver level software interfaces the commands or function calls in the GPIB application to the actual GPIB interface. In other words, in response to function calls made by the application, the GPIB driver level software communicates with the GPIB controller to control the GPIB instruments. The GPIB driver level software thus handles the details of communication, i.e., the transfer of commands and data, over the GPIB connection between the computer and the GPIB instruments. As discussed in the background section, the de facto standard for GPIB driver level software is the NI-488 software architecture available from National Instruments. The NI-488 software architecture includes an Application Programming Interface (API) which allows the GPIB application to call or invoke functions in the GPIB driver level software to communicate with the GPIB hardware.

As discussed above, the GPIB hardware comprises a GPIB interface card, typically a plug-in card to a personal computer, which couples through the GPIB to the one or more GPIB instruments.

GPIB Global Variables

Each NI-488 function and NI-488.2 routine updates four global variables to reflect the status of the device or board being used. These global status variables are the status word (ibsta), the error variable (iberr) and the count variables (ibcnt and ibcntl). These global status variables contain useful information about the performance of the user's application. The GPIB application is generally required to check these variables after each GPIB call.

1. Status Word—ibsta

All functions update a global status word, ibsta, which comprises information about the state of the GPIB and the GPIB hardware. The value stored in ibsta is the return value of all of the NI-488 functions except ibfind and ibdev. Various status bits in ibsta can be examined, and that information is used to make decisions about continued processing. If the user checks for possible errors after each call using the ibsta ERR bit, debugging the application is much easier.

The language header file in the NI-488.2 software product defines each of the ibsta status bits. The user application can test for an ibsta status bit being set using the bit-wise AND operator ('&' in C/C++). For example, the ibsta ERR bit is bit 15 of ibsta. To check for a GPIB error, the following statement

```
if(ibsta & ERR)
    printf("GPIB error encountered");
``` is used after each GPIB call:

2. Error Variable—iberr

If the ERR bit is set in the status word (ibsta), a GPIB error has occurred. When an error occurs, the error type is specified by the value in iberr. To check for a GPIB error, the following statement is used after each GPIB call:

```
if(ibsta & ERR)
    printf("GPIB error %d encountered", iberr);
```

3. Count Variables—ibcnt and ibcntl

The count variables are updated after each read, write, or command function. In Win32 applications, ibcnt and ibcntl are 32-bit integers. On some systems, like MS-DOS, ibcnt is a 16-bit integer, and ibcntl is a 32-bit integer. For cross-platform compatibility, ibcntl is used. If the GPIB application is reading data, the count variables indicate the number of bytes read. If the GPIB application is sending data or commands, the count variables reflect the number of bytes sent.

The GPIB application can use the count variables to null-terminate an ASCII string of data received from an instrument. For example, if data is received in an array of characters, ibcntl can be used to null-termninate the array and print the measurement on the screen as follows:

```
char rdbuf[512];
ibrd (ud, rdbuf, 20L);
if (!(ibsta & ERR)){
    rdbuf[ibcntl] = '\0';
    printf ("Read: %s\n", rdbuf);
}
else {
    error( );
}
```

Accessing Per-Thread Copies of GPIB Global Variables

According to the present invention, a multithreaded application accesses per-thread copies of the GPIB global variables using a special set of GPIB calls. Whenever a thread first makes a GPIB call, the driver begins maintaining a private copy of all of the GPIB global variables for that thread. The driver preferably maintains a separate private copy for each thread. When a thread later desires to access its private copy of a global variable, the thread invokes or calls a thread-local access function or command. The functions used to access these per-thread GPIB global variables are ThreadIbsta, ThreadIberr, ThreadIbcnt, and ThreadIbcntl The following code shows the set of functions that can be used to access these per-thread GPIB global variables:
int ThreadIbsta( ); //return thread-specific ibsta
int ThreadIberr( ); //return thread-specific iberr
int ThreadIbcnt( ); //return thread-specific ibcnt
long ThreadIbcntl( ); //return thread-specific ibcntl Thus, in the user's application, instead of accessing the per-process GPIB global variables, the application substitutes a call to get the corresponding per-thread GPIB global. For example, the line of code:
    if (ibsta & ERR)
        could be replaced by:
    if (ThreadIbsta( ) & ERR)

A fast way to convert a GPIB application to use per-thread GPIB global variables, is to add the following #define lines at the top of the GPIB application C file:
define ibsta ThreadIbsta( )
define iberr ThreadIberr( )
define ibcnt ThreadIbcnt( )
define ibcntl ThreadIbcntl( )

Thus the user is only required to add the above #define statements to an existing GPIB application, and the existing GPIB application can then take advantage of multiple threads accessing global variables. This is possible because the thread-local functions are designed to return values that are identical to those defined by the global variables.

Description of the thread-local commands

1. ThreadIbsta
Purpose: Return the value of the thread-specific ibsta.
C Format: int ThreadIbsta ( )
Visual Basic Format: rc %=Threadibsta ( )
Input: none; No input parameters
Output: Function Return Value of ibsta for the calling thread
Description: ThreadIbsta returns the current value of ibsta for a particular thread of execution.

2. ThreadIberr
Purpose: Return the value of the thread-specific iberr.
C Format: int ThreadIberr ( )
Visual Basic Format: rc %=ThreadIberr ( )
Input: none; No input parameters
Output: Function Return—Value of iberr for the calling thread Description: ThreadIberr returns the current value of iberr for a particular thread of execution.

3. ThreadIbcnt

Purpose: Return the value of the thread-specific ibcnt.

C Format: int ThreadIbcnt ( )

Visual Basic Format: rc %=ThreadIbcnt ( )

Input: none; No input parameters

Output: Function Return—Value of ibcnt for the calling thread

Description: ThreadIbcnt returns the current value of ibcnt for a particular thread of execution.

4. ThreadIbcntl

Purpose: Return the value of the thread-specific ibcntl.

C Format: long ThreadIbcntl ( )

Visual Basic Format: rc&=ThreadIbcntl ( )

Input: none; No input parameters

Output: Function Return—Value of ibcntl for the calling thread

Description: ThreadIbcntl returns the current value of ibcntl for a particular thread of execution.

The global GPIB status variables (ibsta, iberr, ibcnt, ibcntl) are maintained on a per process basis, which means that their values are updated whenever any thread in that process makes GPIB calls. The thread-local GPIB status variables described above are maintained on a per thread basis, which means that their values are updated whenever that particular thread makes GPIB calls. If a GPIB application performs GPIB operations in multiple threads, the application examines the thread GPIB status variables using ThreadIbsta, ThreadIberr, ThreadIbcnt, and ThreadIbcntl, instead of using the global GPIB status variables.

FIGS. 3–5: Flowchart Diagrams

Referring now to FIGS. 3–5, flowchart diagrams illustrating operation of the present invention are shown. These flowcharts presume that a multi-threaded GPIB application is operating in the GPIB system 100. This multi-threaded GPIB application includes a plurality, i.e., two or more, threads which each make GPIB calls to access GPIB global status variables. The plurality of threads in the multi-threaded GPIB application make the GPIB thread-local function calls to invoke the ThreadIbsta, ThreadIberr, ThreadIbcnt, and ThreadIbcntl thread-local functions discussed above.

Referring first to FIG. 3, as shown in step 302 a thread in the GPIB application makes a GPIB call, i.e., makes a call to a function in the GPIB driver level software. In step 304, in response to the thread making the GPIB call, the GPIB driver level software begins maintaining a per-thread copy of the global status variables. Thus, according to the preferred embodiment of the invention, the GPIB driver level software operates such that, when a thread in a multi-threaded GPIB application first makes any call to the GPIB driver level software, the GPIB driver level software starts maintaining a copy of each of the global status variables for that respective thread. It is noted that the GPIB driver level software maintains copies of these global variables for the respective thread until the respective thread exits. It is also noted that the GPIB driver level software maintains per-thread copies of these global variables for all threads that make GPIB calls.

Referring now to FIG. 4, in step 402 a respective thread makes a thread-local function call to access a global variable. In other words, in step 402 the respective thread makes a call to a thread-local function to access a global variable. Here it is presumed that the respective thread making the thread-local function call has previously made a GPIB call in step 302, and in response the GPIB driver level software has previously begun maintaining, and is still maintaining, a per-thread copy of the global status variables for the respective thread. The thread-local function call made by the thread in step 402 preferably comprises one of the ThreadIbsta, ThreadIberr, ThreadIbcnt, and ThreadIbcntl function calls described above.

In response to the thread making the thread-local function call in step 402, the GPIB driver level software executes the thread-local function. More specifically, in step 404 the GPIB driver level software determines the value of the global variable for the respective thread. This involves the software retrieving the value of the thread-specific value of the global variable being maintained in step 304 of FIG. 3. Once the thread-specific value of the global variable has been determined, in step 406 the thread-specific value of the global variable is provided to the respective thread.

As noted above, it is presumed that multiple threads in the multi-threaded GPIB application are each accessing global status variables. As described above, the method of the present invention operates to maintain the global status variable values on a per-thread basis and provides these values to the respective threads on the per-thread basis. Thus, where a first thread in the multi-threaded application accesses a first global variable and a second thread in the multi-threaded application accesses the first global variable, it is possible that the first thread will receive a different value than the second thread, since the values of the first global variable are being maintained on a per-thread basis. In other words, in this example different copies or versions of the first global variable are being maintained for the first and second threads, and thus the values may not be identical. It is also noted that each of the global variables are maintained on a per-thread basis, the values being stored in different memory areas.

Referring now to FIG. 5, an alternate embodiment of the present invention is shown. In this embodiment, a thread in the GPIB application or user application can indicate a respective memory area where the per-thread copy of a global variable is to be stored. Thus, in this embodiment, a respective thread in the GPIB application can access a per-thread copy of a global variable in a respective memory area without having to use the thread-local access function.

As shown, in step 502 the GPIB driver level software receives input indicating a first memory area for storage of per-thread copies of one or more global variables for a respective thread, e.g., a first thread. In response, in step 504 the GPIB driver level software maintains a per-thread copy of the one or more global variables for the first thread in the first memory area specified by the GPIB application. Thus, when the GPIB application desires to later access the per-thread values of the one or more global variables, the respective thread can simply access the first memory area where the values are stored, and the respective thread is not required to use the thread-local access function.

Conclusion

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method of accessing global variables from multiple threads in a GPIB system, wherein the system comprises a GPIB application which interfaces through GPIB driver software to a GPIB device, wherein the GPIB application and the GPIB driver software execute on a computer system, wherein the GPIB application includes a plurality of threads, the method comprising:

maintaining a copy of a first global variable for a first thread;

maintaining a copy of the first global variable for a second thread;

said first thread in said GPIB application calling a thread-local access function to access said first global variable;

determining a value of the first global variable for said first thread in response to said calling the thread-local access function, wherein said determining retrieves a value of the first global variable for said first thread being maintained in said step of maintaining a copy of the first global variable for said first thread;

providing the value of the first global variable for said first thread in response to said determining the value of the first global variable for said first thread;

said second thread in said GPIB application calling the thread-local access function to access said first global variable;

determining a value of the first global variable for said second thread in response to said calling the thread-local access function, wherein said determining retrieves a value of the first global variable for said second thread being maintained in said step of maintaining a copy of the first global variable for said second thread;

providing the value of the first global variable for said second thread in response to said determining the value of the first global variable for said second thread.

2. The method of claim 1, wherein the method maintains copies of the first global variable for said first thread and for said second thread on a per-thread basis;

wherein, during subsequent accesses of said first global variable by said first thread and said second thread, the method provides a respective value of said first global variable on a per-thread basis.

3. The method of claim 1, wherein the value of the first global variable for said first thread is different than the value of the first global variable for said second thread.

4. The method of claim 1, said first thread in said GPIB application making a first call to the GPIB driver software, wherein said first thread makes said first call prior to said first thread calling the thread-local access function to access said first global variable;

wherein said maintaining the copy of the first global variable for said first thread is performed in response to the GPIB application making said first call to the GPIB driver software;

wherein said maintaining the copy of the first global variable for said first thread is performed until the first thread exits.

5. The method of claim 1, where the method repeats for a plurality of different global variables.

6. The method of claim 1, wherein said maintaining a copy of the first global variable for said first thread maintains the copy of the first global variable for said first thread in a first memory area;

wherein said maintaining a copy of the first global variable for said second thread maintains the copy of the first global variable for said second thread in a second memory area;

wherein said first memory area is different than said second memory area.

7. The method of claim 1, further comprising:

receiving user input indicating a first memory area for storage of said value of the first global variable for said first thread;

wherein said maintaining the copy of said first global variable for said first thread stores said copy in said first memory area;

wherein the method further comprises said first thread in said GPIB application accessing said value of the first global variable for said first thread from said first memory area.

8. The method of claim 1, wherein the GPIB application was originally not designed for thread-local access to global variables, the method further comprising:

inserting one or more instructions into the GPIB application prior to said first thread or said second thread in said GPIB application calling a thread-local access function to access said first global variable;

wherein said instructions enable said GPIB application to use said thread-local access function.

9. A method of accessing global variables from multiple threads in a GPIB system, wherein the system comprises a GPIB application which interfaces through GPIB driver software to a GPIB device, wherein the GPIB application and the GPIB driver software execute on a computer system, wherein the GPIB application includes a plurality of threads, the method comprising:

maintaining copies of one or more global variables for each of the plurality of threads, wherein copies of said one or more global variables for each of said plurality of threads are maintained on a per-thread basis;

a first thread in said GPIB application calling a thread-local access function to access a first global variable of said one or more global variables;

determining a value of the first global variable for said first thread in response to calling the thread-local access function, wherein said determining retrieves a value of the first global variable for said first thread being maintained in said step of maintaining;

providing the value of the first global variable for said first thread in response to said determining the value of the first global variable for said first thread.

10. The method of claim 9, further comprising:

a second thread in said GPIB application calling the thread-local access function to access said first global variable;

determining a value of the first global variable for said second thread in response to said calling the thread-local access function;

providing the value of the first global variable for said second thread in response to said determining the value of the first global variable for said second thread.

11. The method of claim 9, wherein the value of the first global variable for said first thread is different than the value of the first global variable for said second thread.

12. The method of claim 9, said first thread in said GPIB application making a first call to the GPIB driver software, wherein said first thread makes said first call prior to said first thread calling the thread-local access function to access said first global variable;

wherein said maintaining the copy of the first global variable for said first thread and said maintaining the copy of the first global variable for said second thread are performed in response to the GPIB application making said first call to the GPIB driver software;

wherein said maintaining the copy of the first global variable for said first thread is performed until the first thread exits.

13. The method of claim 9, where the method repeats for a plurality of different global variables.

14. The method of claim 9, wherein said maintaining copies of one or more global variables for each of said plurality of threads maintains said copies of said one or more threads in respective different memory areas.

15. The method of claim 9, further comprising:

receiving user input indicating a first memory area for storage of said value of the first global variable for said first thread;

wherein said maintaining the copy of said first global variable for said first thread stores said copy in said first memory area;

wherein the method further comprises said first thread in said GPIB application accessing said value of the first global variable for said first thread directly from said first memory area.

16. A GPIB system which enables multiple threads in a GPIB application to safely access global variables, the GPIB system comprising:

a computer system comprising a CPU and memory, wherein the memory stores the GPIB application and GPIB driver software, wherein the GPIB application and the GPIB driver software execute on the computer system, wherein the GPIB application includes multiple threads;

a GPIB device coupled to the computer system, wherein the GPIB application interfaces through the GPIB driver software to the GPIB device;

wherein the computer system memory is operable to maintain a copy of a first global variable for a first thread and is operable to maintain a copy of the first global variable for a second thread;

wherein said first thread in said GPIB application is operable to call a thread-local access function to access said first global variable;

wherein the GPIB driver software is operable to determine a value of the first global variable for said first thread and provide the value of the first global variable for said first thread in response to the thread-local access function being called, wherein said determining retrieves a value of the first global variable for said first thread being maintained;

wherein said second thread in said GPIB application is operable to call the thread-local access function to access said first global variable;

wherein the GPIB driver software is operable to determine a value of the first global variable for said second thread and provide the value of the first global variable for said second thread in response to the thread-local access function being called, wherein said determining retrieves a value of the first global variable for said second thread being maintained.

17. A memory media which stores program instructions for accessing global variables from multiple threads in a GPIB system, wherein the system comprises a GPIB application which interfaces through GPIB driver software to a GPIB device, wherein the GPIB application and the GPIB driver software execute on a computer system, wherein the GPIB application includes a plurality of threads, wherein the program instructions are executable to implement the steps of:

maintaining a copy of a first global variable for a first thread;

maintaining a copy of the first global variable for a second thread;

determining a value of the first global variable for said first thread in response to said first thread calling a thread-local access function, wherein said determining retrieves a value of the first global variable for said first thread being maintained in said step of maintaining a copy of the first global variable for said first thread;

providing the value of the first global variable for said first thread in response to said determining the value of the first global variable for said first thread;

determining a value of the first global variable for said second thread in response to said second thread calling the thread-local access function, wherein said determining retrieves a value of the first global variable for said second thread being maintained in said step of maintaining a copy of the first global variable for said second thread;

providing the value of the first global variable for said second thread in response to said determining the value of the first global variable for said second thread.

* * * * *